No. 624,412. Patented May 2, 1899.
H. G. VOIGHT.
FASTENER FOR MEETING RAILS OF SASHES.
(Application filed Jan. 13, 1899.)
(No Model.)
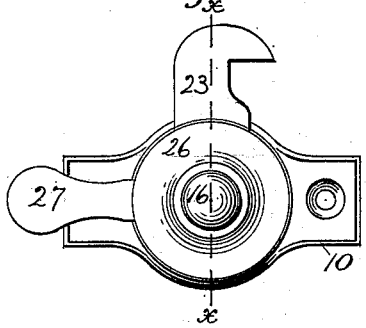
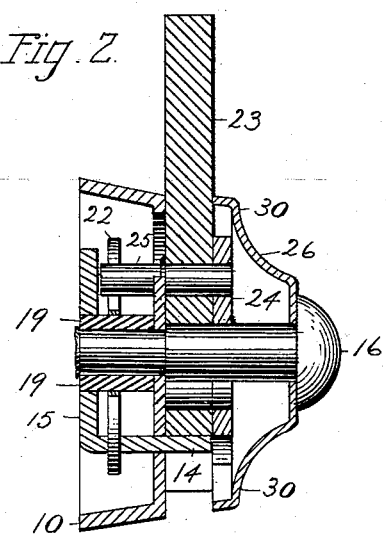
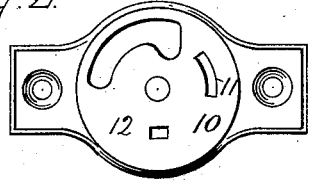
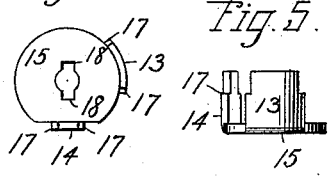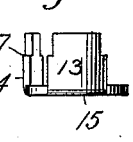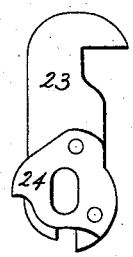
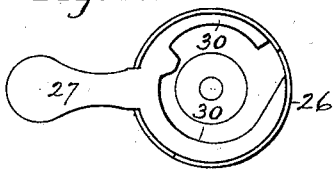
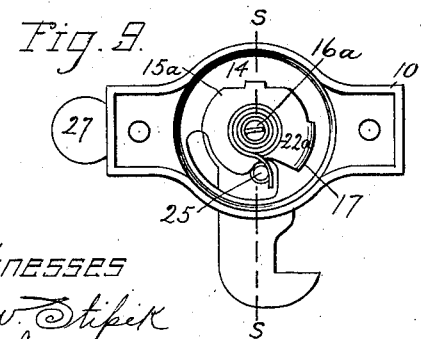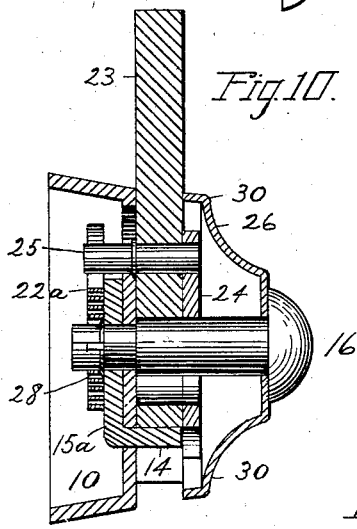
Witnesses
Inventor
Henry G. Voight.
By James Shepard.
Atty.
THE NORRIS PETERS CO., PHOTO-LITHO., WASHINGTON, D. C.

UNITED STATES PATENT OFFICE.

HENRY G. VOIGHT, OF NEW BRITAIN, CONNECTICUT, ASSIGNOR TO THE RUSSELL & ERWIN MANUFACTURING COMPANY, OF SAME PLACE.

FASTENER FOR MEETING-RAILS OF SASHES.

SPECIFICATION forming part of Letters Patent No. 624,412, dated May 2, 1899.

Application filed January 13, 1899. Serial No. 702,065. (No model.)

*To all whom it may concern:*

Be it known that I, HENRY G. VOIGHT, a citizen of the United States, residing in New Britain, in the county of Hartford and State of Connecticut, have invented certain new and useful Improvements in Fasteners for the Meeting-Rails of Sashes, of which the following is a specification.

My invention relates to improvements in fasteners for the meeting-rails of sashes; and the main object of my improvement is simplicity of construction, whereby an efficient fastener is economically produced.

In the accompanying drawings, Figure 1 is a plan view of my fastener. Fig. 2 is an enlarged section thereof on the line *x x* of Fig. 1. Fig. 3 is a detached plan view of the base on the same scale as Fig. 1. Fig. 4 is a detached plan view of the spring-plate and integral lugs. Fig. 5 is a side elevation of the same. Fig. 6 is a reverse plan view of the spring-plate hub. Fig. 7 is a detached plan view of the latch. Fig. 8 is a reverse plan view of the cap and lever-handle. Fig. 9 is a reverse plan view of my sash-fastener in a modified form; and Fig. 10 is an enlarged sectional view of the same on the line *s s*, Fig. 8.

The general form and construction of my fastener are the same as in my Patent No. 610,209, dated September 6, 1898, excepting that I change the construction with reference to making the several parts of sheet metal instead of cast metal. For a detailed description of the several parts and their general mode of operation reference may be had to my aforesaid patent, No. 610,209.

I strike up the base 10 in the form shown in Figs. 1 and 2, with holes or perforations 11 and 12 for the lugs 13 and 14. Instead of forming the lugs 13 and 14 on the base 10, or instead of riveting them thereto, I form said lugs integral with the spring-plate 15, which plate also serves as an additional bearing for the central post 16. The said lugs are provided with spacing-shoulders 17, Figs 4 and 5, in order to govern their projection into and through the top of the base 10 and to define the space between said spring-plate and the under side of said base. The central hole in the spring-plate is also provided with side recesses 18, Fig. 4, for receiving the lugs 19 on the spring-plate hub or collar 20. Said hub or collar is in the form of a short tube, as shown in Fig. 6, with lugs 19 formed in the edge of the metal at one end of said tube. The interior of the spring-hub is intended to fit that part of the post 16 which passes through it.

The latch 23 (shown separately in Fig. 7) is mainly formed of a flat piece of thick metal, with the raised cam portion 24 formed of a separate piece and riveted thereon. The pin or stud 25, against which one end of the spring 22 bears, may serve as one of the rivets for securing the cam portion 24 on the latch 23.

The cap 26 is formed hollow—that is, with a flanged edge—by being struck up in dies, and its flange is notched to form shoulders for the latch and to form a recess to receive the shank of the handle 27, the said handle and integral projections 30 being cut from a plate and laid within the cap, as shown in Fig. 8, the outer edge of said projections fitting within the circular flanged edge. The spring is an ordinary form of coiled spring, with one arm for resting against one of the lugs of the spring-plate and another arm for bearing on the stud or pin 25 of the latch, as shown in Fig. 2.

The several parts being constructed as described, the spring-plate hub has its lugs properly seated in the notches in the central hole of the spring-plate and may be secured thereto, if desired, by upsetting the ends of said lugs. The spring is placed around the hub on the spring-plate, and then said spring-plate, hub, and spring are placed on the under side of the base 10, with the lugs 13 and 14 extending upwardly through the holes 11 and 12 in the base 10 to form the proper studs on the top face of said base. The latch is put in place, the lever-handle, with integral projections, is placed in the cap, and the cap and handle set in place, after which the central post 16 is inserted and secured by riveting or otherwise, and the parts are all secured together for operating in the manner described in my aforesaid patent.

In the construction illustrated in Figs. 9 and 10 the base, the latch, the cap, and the lever-handle are all of them formed as hereinbefore described. The spring 22ª is a coiled or scroll spring, and the central post 16ª is substantially the same as before, only its end is slit to receive the inner arm of the spring. The spring-plate 15ª is the same as before described, only the lugs 13 and 14 are not shouldered and are made shorter and the side notches in the central hole are omitted. When assembled, the spring-plate rests closely against the under side of the base 10, but it serves in part as a bearing or support for the central post 16ª. Said post also holds the parts together, only the holding-shoulder instead of being formed at the extreme end of said post is formed on its body just under the spring-plate, as shown at 28, and the spring is placed below instead of above the spring-plate.

By my present improvements the parts of the fastener of my former patent, No. 610,209, may all be cheaply made of sheet or plate metal. I also add a new part in the form of a spring-plate, which also serves in part for the bearing for the central post. The lugs on the upper face of the base, although formed separately from said base, are substantially as firm and rigid as if cast thereon.

It is apparent that some changes from the specific construction herein disclosed may be made, and therefore I do not wish to be understood as limiting myself to the precise form of construction shown and described, but desire the liberty to make such changes in working my invention as may fairly come within the spirit and scope of the same.

I claim as my invention—

1. In a sash-fastener, the combination of the base 10 having perforations 11 and 12, with the separately-formed spring-plate having integral lugs for entering said perforations and projecting from the top face of said base, substantially as described.

2. In a sash-fastener, the combination of the base 10 having perforations 11 and 12, with the separately-formed spring-plate having integral lugs and spacing-shoulders for fitting said base, substantially as described.

3. In a sash-fastener, the combination of the base 10 having lug-receiving perforations, with the spring-plate having integral lugs fitted to the said perforations in said base, the central hole with side recesses, and the spring-hub having lugs fitted to the said recesses in the said central hole of the said spring-plate, substantially as described.

4. In a sash-fastener, the combination of the cap 26 formed of sheet metal and having a flanged edge, with the lever-handle 27 and integral projections fitted within the said flanged edge of the cap, and the central post 16, the latch, and base for holding the said lever-handle and cap together, substantially as described.

HENRY G. VOIGHT.

Witnesses:
 M. S. WIARD,
 P. M. BRONSON.